(12) United States Patent
Dumas (10) Patent No.: US 10,312,774 B2
(45) Date of Patent: Jun. 4, 2019

(54) SYNCHRONOUS MACHINE PROVIDED WITH AN ANGULAR POSITION SENSOR

(71) Applicant: LOHR ELECTROMECANIQUE, Hagenbieten (FR)

(72) Inventor: Pierre Dumas, Strasbourg (FR)

(73) Assignee: Lohr Electromecanique, Hangenbieten (FR)

(*) Notice: Subject to any disclaimer, the term of this patent is extended or adjusted under 35 U.S.C. 154(b) by 95 days.

(21) Appl. No.: 15/119,949

(22) PCT Filed: Feb. 24, 2015

(86) PCT No.: PCT/FR2015/050443
§ 371 (c)(1),
(2) Date: Aug. 18, 2016

(87) PCT Pub. No.: WO2015/124882
PCT Pub. Date: Aug. 27, 2015

(65) Prior Publication Data
US 2017/0063204 A1     Mar. 2, 2017

(30) Foreign Application Priority Data
Feb. 24, 2014   (FR) ..................... 14 51446

(51) Int. Cl.
*H02K 11/215*   (2016.01)
*H02K 29/08*    (2006.01)
(Continued)

(52) U.S. Cl.
CPC ......... *H02K 11/215* (2016.01); *G01D 5/2013* (2013.01); *H02K 1/26* (2013.01);
(Continued)

(58) Field of Classification Search
CPC .......... H02K 11/25; H02K 11/33; H02K 1/26; H02K 1/27; H02K 11/215; H02K 29/08;
(Continued)

(56) References Cited

U.S. PATENT DOCUMENTS

| 3,663,877 A | * | 5/1972 | Clark | .................... | H02K 29/08 |
| | | | | | 318/400.37 |
| 4,283,664 A | * | 8/1981 | Ebert | ...................... | H02P 6/14 |
| | | | | | 310/DIG. 3 |

(Continued)

FOREIGN PATENT DOCUMENTS

| DE | 3405225 | 8/1984 |
| DE | 102008059005 | 5/2010 |

(Continued)

OTHER PUBLICATIONS

International Search Report conducted in related application PCT/FR2015/050443, dated Apr. 14, 2016.

*Primary Examiner* — Burton S Mullins
(74) *Attorney, Agent, or Firm* — Meunier Carlin & Curfman LLC (57) ABSTRACT

The invention relates to a synchronous machine (1) including a stator (2) and a rotor (3). Said machine is provided with at least one sensor (1a) of the angular position of the rotor (3) and is characterized in that the stator (2) includes a winding provided such as to be supplied with polyphase current by an electronic power device. The rotor (3), which includes permanent magnets (4), is provided such as to rotate about the stator (2). The angular position sensor (1a) extends away from the rotor (3) and is in alignment with the latter at the permanent magnets (4). The angular position sensor (1a) includes at least two sensors (6) for measuring magnetic induction and are provided for detecting variation in the axial magnetic field of the rotor (3) in the form of voltage, and the angular position sensor (1a) moreover (Continued)

includes at least one electronic unit provided for receiving the voltages of the magnetic induction measurement sensors (6) such as to absolutely deduce therefrom the angular position of the rotor (3) and send corresponding information, in real time, to the electronic power device.

12 Claims, 4 Drawing Sheets (51) Int. Cl.
    *G01D 5/20*     (2006.01)
    *H02K 11/25*     (2016.01)
    *H02K 11/33*     (2016.01)
    *H02K 1/26*     (2006.01)
    *H02K 1/27*     (2006.01)
    *H02P 27/08*     (2006.01)

(52) U.S. Cl.
    CPC ............... *H02K 1/27* (2013.01); *H02K 11/25* (2016.01); *H02K 11/33* (2016.01); *H02K 29/08* (2013.01); *H02P 27/08* (2013.01)

(58) Field of Classification Search
    CPC ...... H02K 21/22; H02K 7/1846; H02P 27/08; G01D 5/145; G01R 33/077; G01R 33/06
    USPC ................ 310/68, 162, DIG. 3B, 67 R, 112; 180/65.51; 324/207.25
    See application file for complete search history.

(56) References Cited

U.S. PATENT DOCUMENTS

| | | | | |
|---|---|---|---|---|
| 4,292,575 A | * | 9/1981 | Kuhnlein | H02P 6/14 318/400.04 |
| 4,311,933 A | * | 1/1982 | Riggs | H02K 29/08 310/156.06 |
| 4,882,511 A | * | 11/1989 | von der Heide | G11B 19/20 310/67 R |
| 5,038,065 A | * | 8/1991 | Matsubayashi | H02K 21/14 310/156.15 |
| 5,418,451 A | * | 5/1995 | Maass | G01K 7/38 318/362 |
| 5,568,048 A | * | 10/1996 | Schroeder | G01D 5/145 324/207.12 |
| 6,097,129 A | * | 8/2000 | Furtwangler | F04D 29/058 310/157 |
| 6,166,655 A | * | 12/2000 | Chen | G01D 5/2497 340/686.1 |
| 6,522,130 B1 | * | 2/2003 | Lutz | G01B 7/30 310/68 B |
| 6,774,599 B2 | * | 8/2004 | Ishii | G05B 19/02 318/652 |
| 6,828,702 B2 | * | 12/2004 | Beyer | H02K 21/042 290/35 |
| 6,954,042 B2 | * | 10/2005 | Lee | H02P 6/16 318/400.38 |
| 7,170,242 B1 | * | 1/2007 | Horng | H02P 6/08 318/400.11 |
| 7,567,078 B2 | * | 7/2009 | Takahashi | G01D 5/145 324/207.25 |
| 7,965,004 B2 | * | 6/2011 | Hornberger | G01D 5/145 310/156.05 |
| 8,314,607 B2 | * | 11/2012 | Tanaka | G01D 5/145 324/207.13 |
| 8,803,513 B2 | * | 8/2014 | Hosek | G01B 7/003 324/207.15 |
| 2002/0175674 A1 | | 11/2002 | Raftari | |
| 2004/0021437 A1 | * | 2/2004 | Maslov | B60L 8/00 318/400.01 |
| 2004/0061470 A1 | * | 4/2004 | Ito | H02K 29/08 318/565 |
| 2012/0068653 A1 | | 3/2012 | Horiuchi et al. | |
| 2012/0206073 A1 | * | 8/2012 | Burke | H02K 3/28 318/400.07 |
| 2013/0033215 A1 | | 2/2013 | Krishnamurthy et al. | |

FOREIGN PATENT DOCUMENTS

| | | | | |
|---|---|---|---|---|
| DE | 102011056252 | | 6/2013 | |
| EP | 0552991 | | 7/1993 | |
| EP | 1758230 | | 2/2007 | |
| FR | 2680920 | | 3/1993 | |
| FR | 2987439 | | 8/2013 | |
| FR | 002955669 | * | 7/2018 | ............ G01D 5/145 |
| GB | 2345586 | * | 7/2000 | ............ H02K 7/14 |
| GB | 2483177 | | 2/2012 | |

* cited by examiner

SYNCHRONOUS MACHINE PROVIDED WITH AN ANGULAR POSITION SENSOR

CROSS REFERENCE TO RELATED APPLICATION

This application is a national stage application of International PCT Application No. PCT/FR2015/050443, filed on Feb. 24, 2015, which claims priority to, and the benefit of, French Patent Application No. 1451446, filed on Feb. 24, 2014, each of which is incorporated by reference herein in its entirety.

TECHNICAL DOMAIN

This invention refers to the general technical domain of angular position sensors and the general technical domain of synchronous machines comprising means of generating magnetic induction, and a position sensor of that type.

More particularly, this invention concerns a synchronous machine using sinusoidal electromotive force, comprising a position sensor to control the electric power supply of the said machine. Essentially, the invention is applicable in the field of synchronous machines powered by a multiphase AC voltage.

The invention will be described in greater detail in the following but in a non-limiting manner, with means of generating magnetic induction comprising, as an example, the use of permanent magnets.

A synchronous machine using permanent magnets comprises a wound stator and a rotor supporting permanent magnets. A machine of this type is supplied and driven by means of power electronics.

A synchronous machine using permanent magnets and sinusoidal electromotive force can be controlled by a vectorial control system. This type of control, known in its own right, allows high performance to be obtained, that is, high precision and high dynamic torque. This performance is necessary, in particular for traction motors.

A control system allowing high performance to be obtained, however, requires accurate knowledge of the angular position of the rotor in real time. Generally, the angular position of the rotor is given by a position sensor comprising in particular a rotating part mechanically linked with the rotor. There are different known technologies for determining the angular position of the rotor. For instance, we might refer to the position sensor known as the "resolver", the incremental digital encoder or the absolute encoder.

These known technologies however embody drawbacks. Indeed, the known position sensors all have a rotating part which is mechanically linked with the rotor. This is a major constraint affecting the design of the machine into which the position sensors are to be integrated. As a general rule, the rotating part of the angular position sensor is driven in rotation via a driving tube. As a general rule, such a driving tube passes through the stator and very often has high inertia which can make the measurement of the angular position slower. The lack of precision offered by a measurement of this type results in an alteration of the machine performance. In addition, the fact that it is necessary to pass through the machine to recover angular position information substantially increases the overall complexity. This means using a greater number of mechanical parts, increasing the risks of failure.

Furthermore, on the initial commissioning of a known synchronous machine, an operation known as calibration must be carried out by a converter. During this operation, the machine is rotating and the converter measures the angle corresponding to the electromotive force passing through zero. This calibration operation must be performed again for maintenance operations such as a change of sensor, a change of a rotor or stator or of an electromagnetic part or a change of the complete machine. A calibration operation like this is often difficult to perform, especially for long vehicles such as a railway vehicle since the said vehicles must be lifted to allow the free orientation of the reels during calibration.

The calibration operation is however particularly important because an angular offset between the rotor's measured angular position and its real position results in a large drop in torque. For instance, an offset of one mechanical degree causes a drop of approximately 5% and an offset of two mechanical degrees produces a torque drop of 20%.

Through the document EP 1 758 230 there is also a known electric rotating machine including more particularly a permanent magnet rotor and one or several magnetic sensors to detect a magnetic leak escaping from the said rotor. In such a machine, in which the stator extends around the rotor, the detection of the magnetic flow does not provide the absolute angular position of the said rotor.

DISCLOSURE OF THE INVENTION

Accordingly, the goal of this invention is to remedy the drawbacks mentioned above and to supply a novel synchronous machine including an angular position sensor which supplies in a reliable way magnetic induction values to determine the absolute angular positions of the rotor.

Another goal of this invention is to supply a novel synchronous machine in which the assembly and replacement of an angular position sensor module is particularly simple.

Another goal of this invention is to supply a novel synchronous machine dispensing with a complex calibration operation during the initial commissioning of the said machine or on completion of a maintenance operation.

The assigned goals of the invention are achieved by means of a synchronous machine comprising a stator and a rotor, the said machine being equipped with at least one rotor angular position sensor and characterized in that:
  the stator has a winding designed to be supplied with multi-phase AC current by an electronic power device such as an inverter supplied with current,
  the rotor comprises means of generating magnetic induction and is designed to move in rotation when AC current is supplied to the rotor,
  the angular position sensor module comprises at least one pair of two magnetic induction measurement sensors to detect the variation of the axial magnetic field generated by the means of generating magnetic induction while supplying a voltage, the said sensors of each pair of sensors being at an angular deviation of 90 electrical degrees,
  the induction measurement sensors, integral with the stator, extend from an axial end of the rotor, facing and immediately next to the axial edges of the means of generating a magnetic induction, and
  the angular position sensor module comprising at least one electronic unit to receive the various voltages supplied by the magnetic induction measurement sensors in order to work out the angular position of the rotor in an absolute manner and to transmit the corresponding information to the power electronic device in real time.

According to one example of the embodiment of the synchronous machine conforming to the invention, the rotor extends around the stator.

According to one example of the embodiment of the synchronous machine conforming to the invention, the magnetic induction measurement sensors are attached and set out on at least one removable support so as to extend along a line whose curve substantially matches the curve of the succession of axial edges of the means to generate a magnetic induction.

According to one example of the embodiment conforming to the invention, the synchronous machine comprises at least two angular position sensor modules having a mutual angular deviation.

According to one example of the embodiment conforming to the invention, the synchronous machine comprises two removable supports each having five magnetic induction measuring sensors.

According to one example of the embodiment of the synchronous machine conforming to the invention, the removable support includes at least one electronic circuit of the electronic unit.

According to one example of the embodiment of the synchronous machine conforming to the invention, the removable support includes at least one temperature sensor to measure the ambient temperature of the said synchronous machine.

In another example of the embodiment of the synchronous machine conforming to the invention, the magnetic induction measurement sensors are Hall effect sensors.

In another example of the embodiment of the synchronous machine conforming to the invention, the magnetic induction measurement sensors are magnetoresistance sensors.

According to another example of the embodiment of the synchronous machine conforming to the invention, the electronic power device includes a converter driving the said synchronous machine by pulse width modulation.

In another example of the embodiment of the synchronous machine conforming to the invention, means of generating a magnetic induction are permanent magnets.

In another example of the embodiment of the synchronous machine conforming to the invention, means of generating a magnetic induction comprise electric windings.

The synchronous machine conforming to the invention is for example a wheel motor of a railway or road-going vehicle.

The synchronous machine conforming to the invention therefore has the advantage of supplying a precise measurement of the rotor angular position in real time in an absolute manner.

Another advantage of the synchronous machine conforming to the invention results from the possibility of detecting through its angular position sensor module, a possible short-circuit between two phases in the machine.

Another advantage of the synchronous machine conforming to the invention is related to the fact that it does not require any calibration operation, in particular following a maintenance operation.

Another advantage of the synchronous machine conforming to the invention results from the fact that the mobile position sensor, by directly measuring the field generated by the permanent magnets, indicates the change of the magnetic field in time, thus estimating whether the machine is sound or has suffered from ageing, possibly detrimental to synchronous machine performance.

Other characteristics and advantages of the invention will also appear in the drawings provided as non-limiting illustrations and in which.

DETAILED DESCRIPTION OF FIGURES

Figure 1:
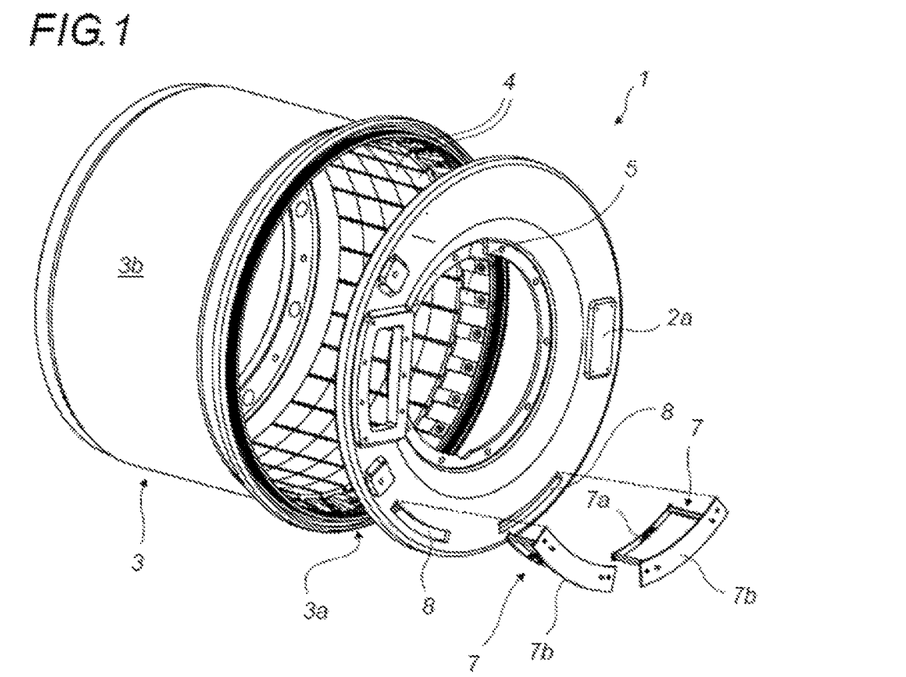
FIG. 1 illustrates an example of the embodiment of a synchronous machine conforming to the invention incorporating an angular position sensor on part of a stator.
Figure 4:
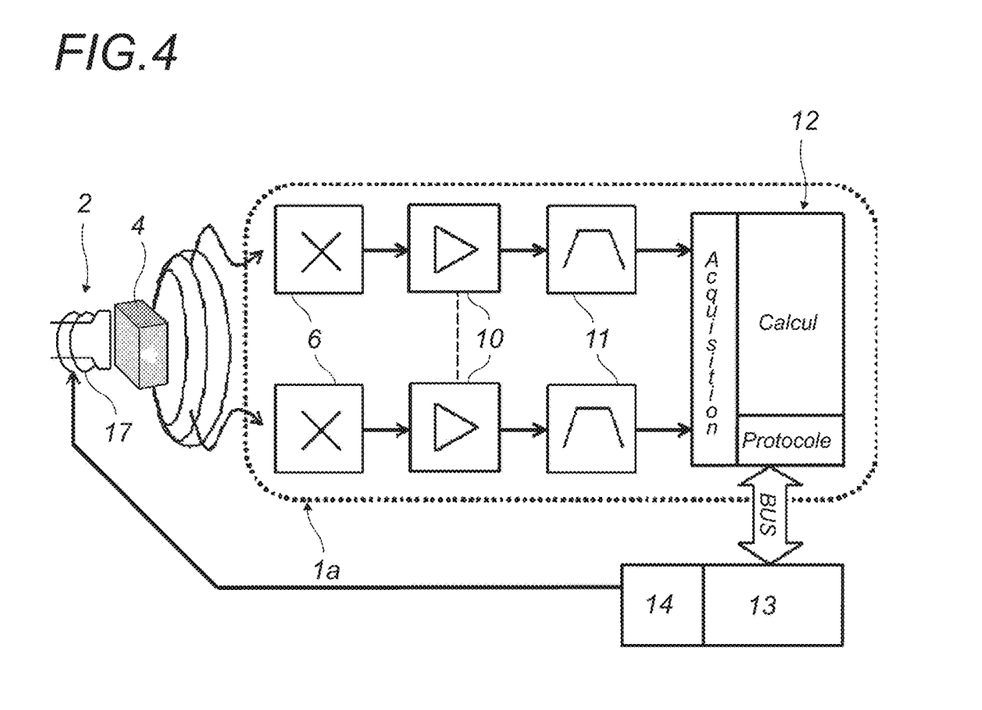
FIG. 4 is a block diagram of the electronic means required for the operation of the angular position sensor module 1a of the synchronous machine 1 conforming to the invention. The latter therefore comprises the wound stator 2 (comprising the electric windings 17) and the rotor 3 comprising the permanent magnets 4.

FIG. 1 illustrates an example of the embodiment of a synchronous machine 1 comprising an angular position sensor mounted to a stator 2 illustrated schematically in FIG. 4. FIG. 1 shows part of the end 2a, for instance, in the form of a flange mechanically integral with the stator 2.

The synchronous machine 1 also includes a rotor 3 provided with permanent magnets 4.

The end part 2a covers at least partially, and without contact, an axial end 3a of the rotor 3. An example of the set-up between the axial end 3a and the end part 2a is illustrated in greater detail in FIG. 2.

The stator 2 comprises a winding, not shown, designed to be supplied with multiphase current by an electronic power device also known as a converter or inverter. Advantageously, the latter is supplied with voltage and current.

The rotor 3 advantageously has a substantially cylindrical shape 3b, the inner face of which is covered with permanent magnets 4. Rotor 3 is designed to rotate about the part of the stator 2 extending in the free space contained inside the said rotor 3. The permanent magnets 4 are, for instance, stacked in an axial direction of the axial grooves made in the inside face of cylinder 3b. The assembly and attachment of the permanent magnets 4 to the inside face of the rotor 3 is done in a known manner.

For instance, the permanent magnets 4 are inserted by being slid into the axial grooves where they are held radially by the matching shapes of the said grooves and the said permanent magnets 4.

Figure 2:
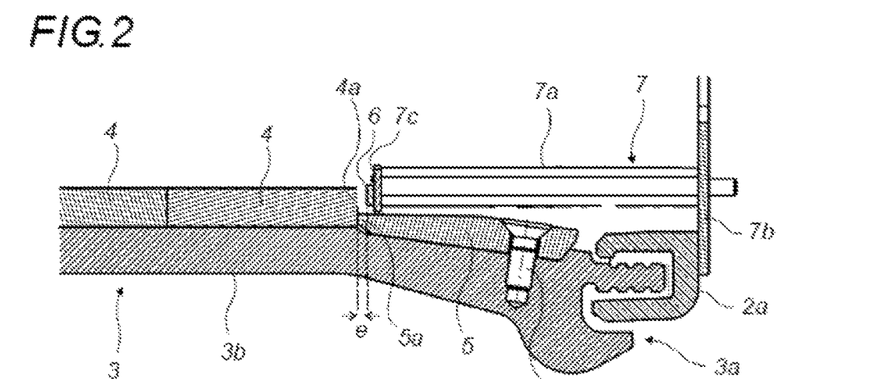
FIG. 2 shows a sectional detail view of FIG. 1.

Axially, the permanent magnets 4 are locked in each groove by means of a retaining part 5 of an anti-magnetic material, illustrated in greater detail in the FIG. 2.

According to an example of a non-limiting embodiment, the retaining part 5 forms a stop 5a preventing the axial movement of the permanent magnets 4 engaged in the corresponding groove. The sizes and shapes of the retaining part 5 are chosen so as not to impede access to an area located opposite at least one part of axial edge 4a of the last permanent magnet 4 engaged in each groove. Other known technical retaining solutions can also be considered.

The axial end 3a of the cylinder 3b, which does not have permanent magnets 4, advantageously comprises for the purpose, a slightly hollowed-out shape in a radial direction. This shape makes it possible to limit the dimensions resulting from the attachment of the retaining part 5. Advantageously, a retaining part 5 is attached to the cylinder 3b, at the end of each groove by a screw 5b, thus actively locking all the rows of permanent magnets 4.

The synchronous machine 1 conforming to the invention also comprises an angular position sensor module 1a for rotor 3. In particular, the angular position sensor module comprises one or several pairs of magnetic induction measuring sensors 6. The latter are designed to detect the variation of the axial magnetic field generated by the permanent magnets 4. This variation of the axial magnetic field is detected and converted into voltage, supplied by the magnetic induction measurement sensors 6.

The angular deviation between the sensors 6 of each pair is 90 electrical degrees. For instance, 90 electrical degrees represent 4.5 mechanical degrees for a motor with 20 pairs of poles.

The angular position sensor la also comprises at least one electronic unit designed to receive the induction voltages from the magnetic induction measurement sensors 6 and to deduct from them the angular position of rotor 3. This determination is carried out in an absolute manner.

The electronic unit also allows real-time transmission of information relative to the angular position of rotor 3 to the electronic power device.

The magnetic induction measurement sensors 6 are mechanically integral with the end part 2a and extend at an axial end of rotor 3, opposite and immediately next to the axial edges 4a of the last permanent magnets 4 engaged in the grooves. When rotor 3 rotates, each axial edge 4a therefore passes in front of magnetic induction measurement sensors 6.

Advantageously, the magnetic measurement sensors 6 are attached to a removable support 7.

Figure 3:
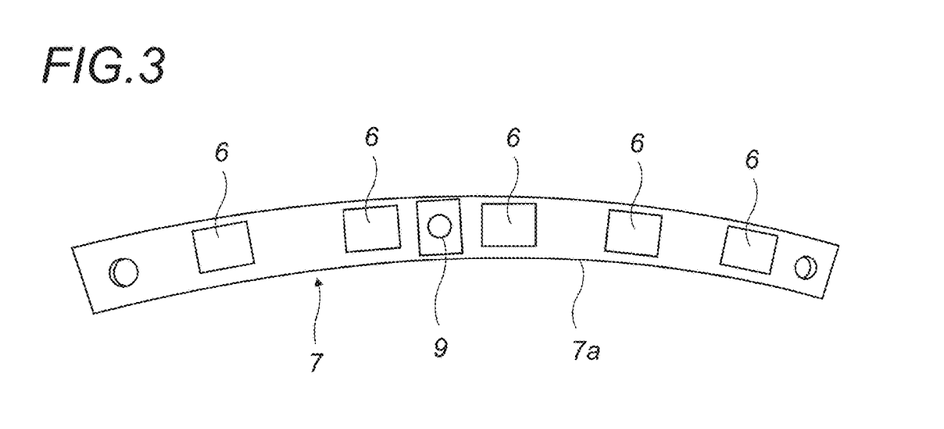
FIG. 3 illustrates an example of the embodiment of a removable support for the angular position sensor module, shown front-on, designed for insertion into a synchronous machine conforming to the invention.

For this purpose, the removable support 7 has an axial support part 7a and a support end part 7b. The end part of the support 7b extends substantially transversely to the part of the axial support 7a. The magnetic induction measurement sensors 6 are arranged on an outer face 7c of the free end of the axial support part 7a.

The removable support 7 preferably forms a curve substantially matching the curve of the rotor 3. The magnetic induction measurement sensors 6 are advantageously attached and set out on an outer face 7c, on a line the curve of which substantially matches the curve of the succession of axial edges 4a of the permanent magnets 4. The removable support 7 is, for instance, inserted into a slot 8 made in the end part 2a. Naturally, the slot 8 has a curve which is identical or similar to the one in the part of the axial support 7a.

Once the removable support 7 is provided with the magnetic induction measurement sensors 6, it is axially inserted into the slot 8 until it abuts on the end part of support 7b, on the outer face of end part 2a. The dimensions of the removable support 7, and in particular the axial length of the axial support part 7a are chosen so that the magnetic induction measurement sensors 6 extend to a distance e from the axial edges 4a. The distance e is included for instance between 1.5 and 2.5 millimeters and preferably equal to 2 millimeters.

All types of attaching means, not shown, can also be used to make the end of support 7b integral with the end part 2a.

In one example of the embodiment, the synchronous machine 1 comprises at least two magnetic induction measurement sensors 6 arranged on a removable support 7, and placed at 90 electrical degrees from one another.

In another example of the embodiment, the synchronous machine 1 conforming to the invention, illustrated in FIG. 1, comprises two removable supports 7 each of which is provided with, for instance, at least two magnetic induction measurement sensors 6.

FIG. 3 is a head-on illustration of an example of the embodiment of a removable support 7 comprising five magnetic induction measurement sensors 6.

Accordingly, according to an example of the embodiment in FIG. 3, the synchronous machine 1 comprises two removable supports 7 each comprising five magnetic induction measurement sensors 6.

Advantageously, the outer face 7c of the axial support part 7a is provided with a temperature sensor 9. The latter is used for measuring the ambient temperature of the synchronous machine 1 in order to adjust its control because the induction depends on the temperature.

In a preferential example of the embodiment, the removal support 7 comprises at least one electronic circuit of the electronic unit or one part of the electronic circuit of the said electronic unit.

As an example, the electronic power device is a converter driving the synchronous machine 1 by pulse width modulation.

The magnetic induction measurement sensors 6 are preferably Hall effect sensors. In another example of the embodiment of synchronous machine 1, the magnetic induction measurement sensors 6 consist of AMR/GMR sensors known as magnetoresistance sensors.

While the Hall effect sensors can be used for measuring the continuous component of the magnetic field, magnetoresistance sensors operate on the basis of the electrical resistance variation of a material depending on the direction of the magnetic field applied to it. These sensors are known in their own right and accordingly are not described any further.

By using Hall effect sensors or magnetoresistance sensors, the operation of calibrating the angular position sensor 1a is no longer necessary. Indeed, these sensors measure the spatial distribution of the magnetic field generated by the permanent magnets 4 even when the synchronous machine 1 is at a stop. This dispenses with the need for any calibration operation on the commissioning of the synchronous machine 1 or after a maintenance operation on the said synchronous machine 1. This represents an outstanding advantage for the synchronous machine 1 conforming to the invention.

FIG. 4 is a block diagram of the electronic means required for the operation of the angular position sensor module la of the synchronous machine 1 conforming to the invention. The latter therefore comprises the wound stator 2 and the rotor 3 comprising the permanent magnets 4.

The angular position sensor la therefore comprises functional means which comprise induction measurement sensors 6, associated with the electronic unit for the acquisition of a signal and for calculating the positioning angle of the rotor 3.

The functional means comprise, for instance, two magnetic induction measuring sensors 6, mounted in to be fixed, without contact, and facing the permanent magnets 4. Information coming from these induction measuring sensors 6 is then amplified and filtered respectively by amplification means 10 and filtering means 11, before being acquired by a computer 12. This computer 12 of the electronic unit therefore determines a rotor angle (angular position of the rotor) from the information from the induction measuring sensors 6 and in real time transmits the rotor angle to a vectorial control system 13 which controls a converter 14.

The rotor angle is transmitted to the vectorial control system 13 via a field BUS type protocol such as SSI, PROFIBUS or another. In addition, the sign of the rotor angle determined by the computer 12 defines the direction of rotation of the synchronous machine 1.

Figure 5:
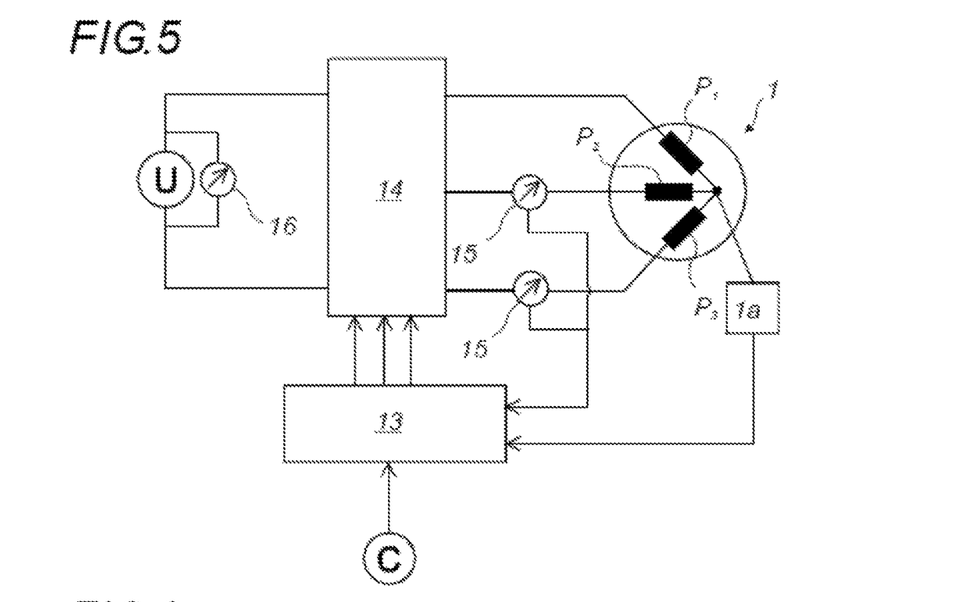
FIG. 5 illustrates, by means of a functional diagram, an example of the vectorial control system of a permanent magnet and sinusoidal electromotive force synchronous machine, conforming to the invention.

FIG. 5, by means of a functional diagram, illustrates the vectorial control system 13 of a synchronous machine 1 with permanent magnets 4 and sinusoidal electromotive force. In this example of a vectorial control system, the synchronous machine 1 comprises the converter 14 supplied with electric voltage.

The vectorial control system 13 controls the converter 14 by means of pulse width modulation PWM to generate a medium power supply voltage on each of the phases $P_1$, $P_2$, $P_3$ of synchronous machine 1 and thereby, a determined current in each of the said phases $P_1$, $P_2$, $P_3$. The converter 14 therefore transforms the voltage supplied by a DC voltage source U into a three phase voltage supplying the synchronous machine 1. The latter operates, for instance, by traction and alternately as a three phase voltage generator when a vehicle is in the braking phase.

The vectorial control system 13 comprises a converter control unit 14, current sensors 15, a voltage sensor 16 and the angular position sensor 1a of the synchronous machine 1.

The vectorial control system 13 receives, for instance, the torque setpoint C. From the information derived from the current sensors 15, the angular position sensor module 1a and from the setpoint C, the converter control unit 14 calculates the voltage vector to be applied to the said converter 14 so that the synchronous machine 1 reaches the torque setpoint C. The vectorial control system 13, in particular the permanent magnet 4 and sinusoidal electromotive force synchronous machine 1, is known in its own right and will therefore not be described any further here.

The synchronous machine 1 has the outstanding advantage of comprising an angular position sensor 1a capable of directly measuring the magnetic field produced by the permanent magnets 4 and thereby knowing how the magnetic field changes in the course of time. In this way, any deterioration of the performance of permanent magnets 4 can be detected, and thereby, so can the performance of the synchronous machine 1 conforming to the invention.

Furthermore, angular position sensor 1a of synchronous machine 1 is capable of detecting an abrupt increase in the induced magnetic field, resulting from short-circuiting between phases.

Figure 6:
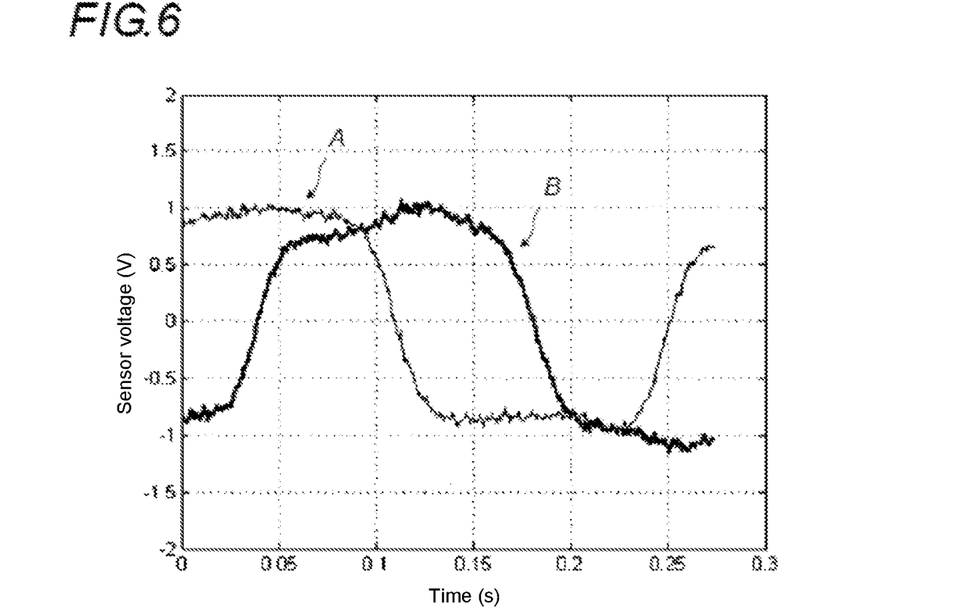
FIG. 6 is an example of the signals measured by magnetic induction sensors with a synchronous machine conforming to the invention.

FIG. 6 is an example of the signals measured by magnetic induction sensors 6 mutually arranged at 90 electrical degrees from one another. An arrangement like this corresponds to a mechanical angle of 4.5° for machines comprising 20 pairs of poles. A module like this is capable of measuring the axial field produced by the magnets. The signals A and B, respectively depicted as fine and broad lines, are supplied by two respective sensors 6 in the form of an electric voltage V and consist of sinusoidal signals deformed by the presence of order 3 harmonics in the axial field. The signals A and B are signals that are measured and filtered in a known way.

Figure 7:
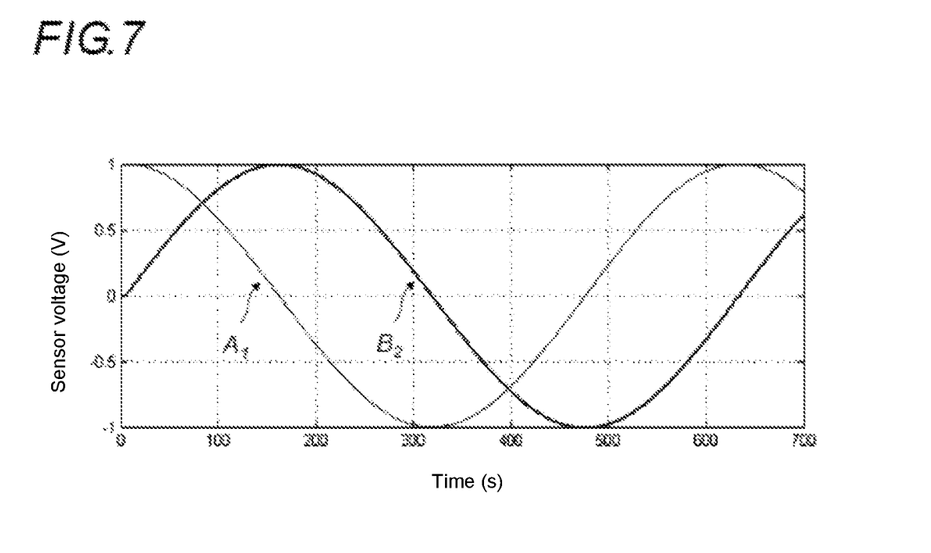
FIG. 7 is an example of the corrected signal obtained by an angular position sensor module comprising two sensors, producing standardized axial field values according to time.

To correct any non-linearity in the signal, it is possible to use an adaptive filtering device, known in its own right, or to use a correction device based on the use of several angular position sensor modules 1a having any angular deviation between the modules Following this correction, the measured, filtered and corrected values have sinusoidal shapes Al and Bi from which the angular position of rotor 3 can be determined. FIG. 7 is an example of the corrected signals $A_1$ and $B_1$, obtained by an angular position sensor module comprising two sensors, producing standardized axial field values according to time.

Figure 8:
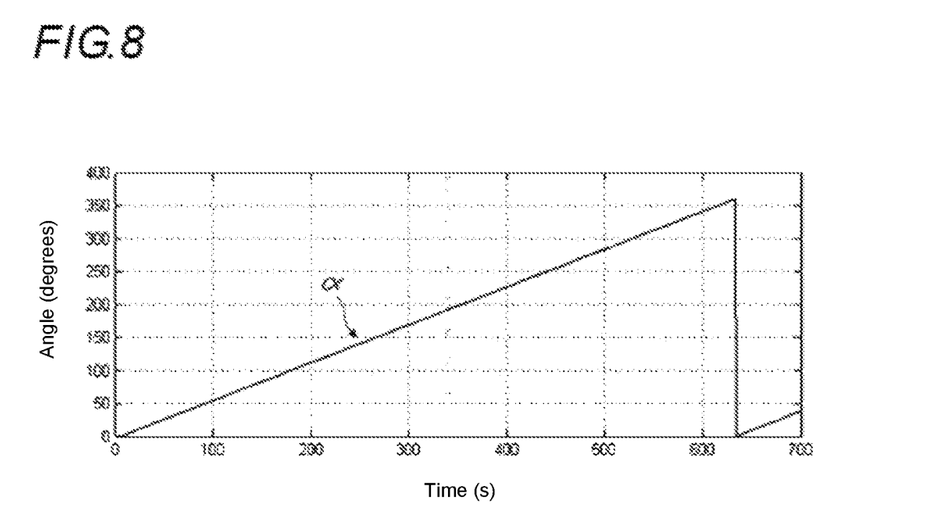
FIG. 8 represents the angular position calculated from the axial field measured in a synchronous machine with two poles conforming to the invention.

As an example, FIG. 8 represents the absolutes angular position α, known as the angle, calculated from the axial field measured in a synchronous machine 1 with two poles conforming to the invention.

The determination of the angular position α is made by the electronic unit according to the calculations specified below while considering that y correspondence to the values illustrated by the curve of signal $B_1$ and that x correspondence to the values illustrated by the curve of signal $A_1$. Accordingly:

if $x>0$ and $y>0$; $\alpha=\mathrm{atan}(y/x)$ if $x=0$ and $y>0$; $\alpha=\pi/2$ if $x<0$ and $y\geq 0$; $\alpha=\pi+\mathrm{atan}(y/x)$ if $x<0$ and $y<0$; $\alpha=\pi+\mathrm{atan}(y/x)$ if $x=0$ and $y<0$; $\alpha=3\pi/2$ if $x>0$ and $y<0$; $\alpha=\mathrm{atan}(y/x)+2\pi$ Permanent magnet 4 and sinusoidal electric force synchronous machine 1, conforming to the invention, advantageously form a wheel motor.

The synchronous machine conforming to the invention can also be used as a winch motor or an elevator motor.

It is obvious that this description is not confined to the examples explicitly described but also extends to other embodiments and/or implementation methods.

Accordingly, a described characteristic may be replaced by an equivalent technical characteristic without moving out of the framework of the invention.

The invention claimed is:

1. A synchronous machine comprising a stator and a rotor, the machine being equipped with at least one angular position sensor module of the rotor, wherein:
   the stator has a winding designed to be supplied with multi-phase AC current by an electronic power device,
   the rotor comprises components that generate magnetic induction and designed to move in rotation when power is supplied to the stator,
   the angular position sensor module comprises at least one pair of two magnetic induction measurement sensors to detect the variation of the axial magnetic field generated by the components that generate magnetic induction while supplying a voltage, the said sensors of the module or of each module being at an angular deviation of 90 electrical degrees,
   the magnetic induction measurement sensors, integral with the stator, extend at an axial end of rotor, opposite and immediately next to the axial edges of the components that generate the magnetic induction, wherein the magnetic induction measurement sensors are attached and set out on at least one removable support of the stator so as to extend along a line whose curve substantially matches the curve of the succession of axial edges of the components that generate the magnetic induction, and the angular position sensor module comprising at least one electronic unit to receive output voltages supplied by the magnetic induction measurement sensors, to determine an absolute angular position of the rotor and to transmit the determined absolute angular position to the electronic power device in real time.

2. The synchronous machine according to claim 1, wherein the rotor extends around the stator.

3. The synchronous machine according to claim 1, comprising at the least two angular position sensor modules.

4. The synchronous machine according to claim 1 wherein the at least one removable support comprises two removable supports each provided with five magnetic induction measurement sensors, including the at least one pair of two magnetic induction measurement sensors.

5. The synchronous machine according to claim 1 wherein the removable support comprises at least one electronic circuit of the electronic unit.

6. The synchronous machine according to claim 1, wherein the removable support comprises a temperature sensor.

7. The synchronous machine according to claim 1, wherein the magnetic induction measurement sensors comprise Hall effect sensors.

8. The synchronous machine according to claim 1, wherein the magnetic induction measurement sensors comprise magnetoresistance sensors.

9. The synchronous machine according to claim 1, wherein the electronic power device includes a converter configured to drive the said synchronous machine by pulse width modulation.

10. The synchronous machine according to claim 1, wherein the components that generate the magnetic induction comprise permanent magnets.

11. The synchronous machine according to claim 1, wherein the synchronous machine is implemented as a wheel-motor of a vehicle.

12. The synchronous machine according to claim 1, wherein the at least one pair of two magnetic induction measurement sensors comprises a first pair of magnetic induction measurement sensors and a second pair of magnetic induction measurement sensors, wherein a magnetic induction measurement sensor of the first pair is at an angular deviation of 90 electrical degrees to a nearby magnetic induction measurement sensor of the first pair, and wherein a magnetic induction measurement sensor of the second pair is at an angular deviation of 90 electrical degrees to a nearby magnetic induction measurement sensor of the first pair.

* * * * *